June 21, 1955
E. F. CAHOON ET AL
2,711,442
TELESCRIBER
Filed Sept. 20, 1950.
9 Sheets-Sheet 1
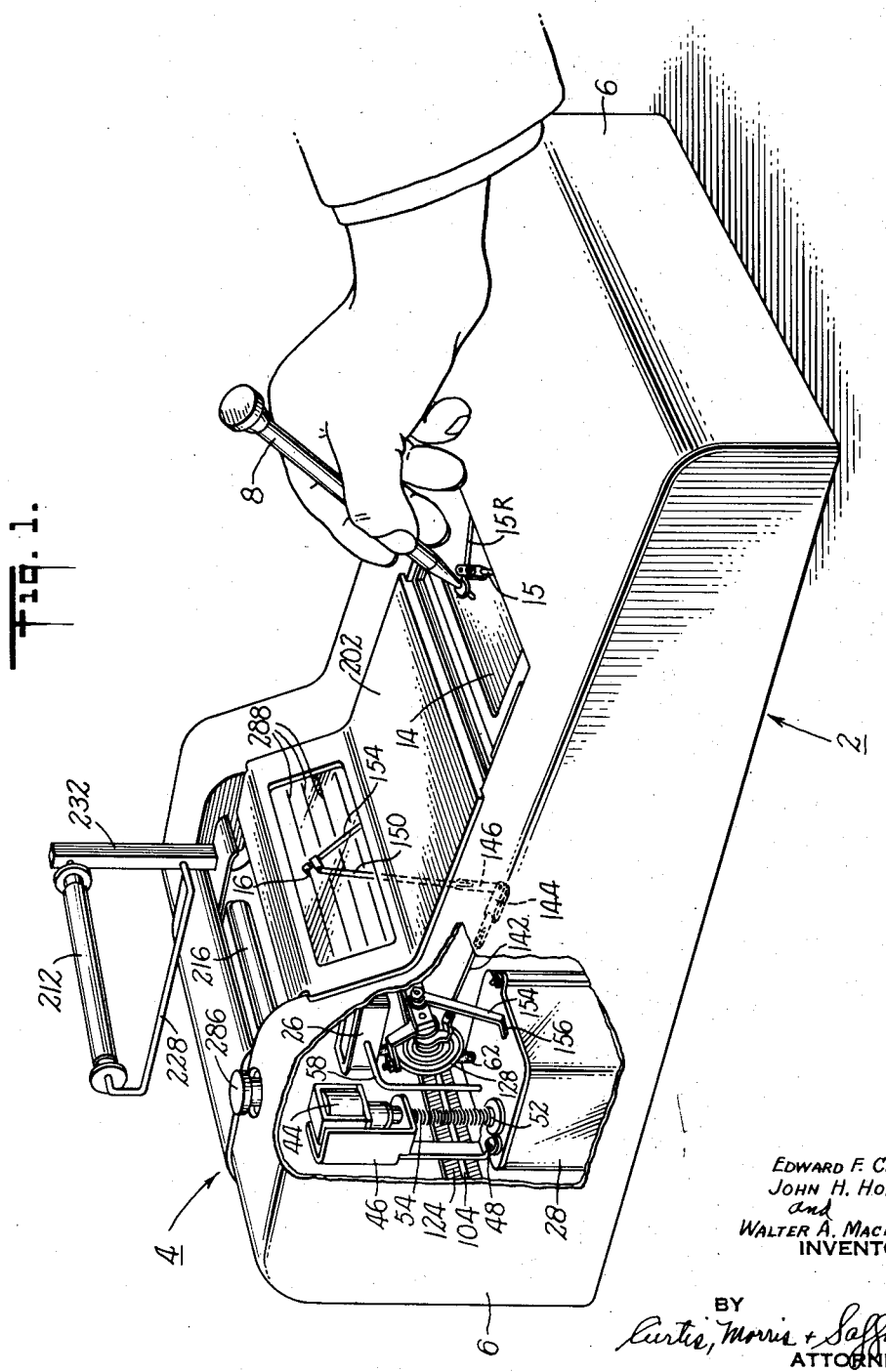
EDWARD F. CAHOON
JOHN H. HOLLAND
and
WALTER A. MACDONALD
INVENTORS
BY
Curtis, Morris + Safford
ATTORNEYS

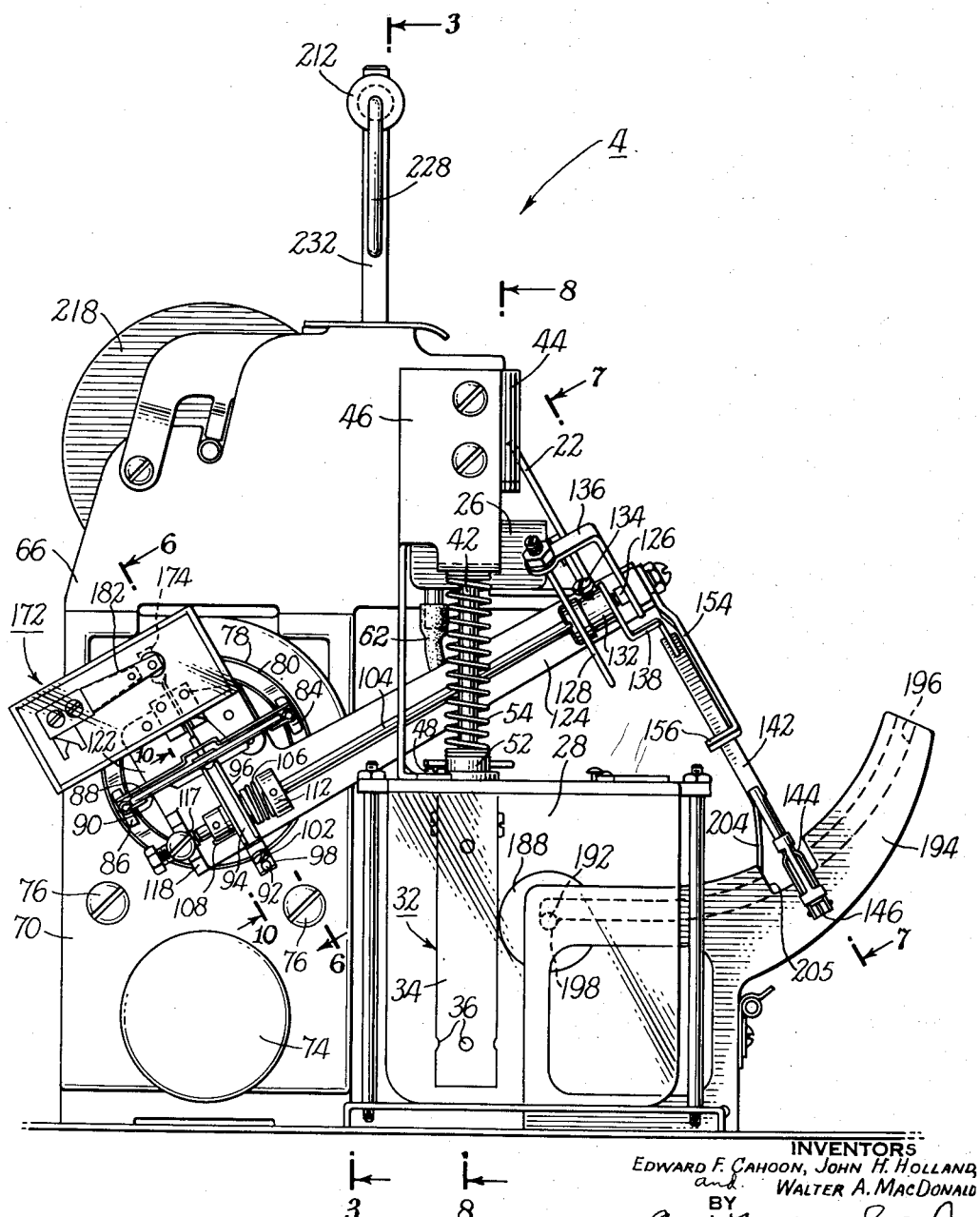

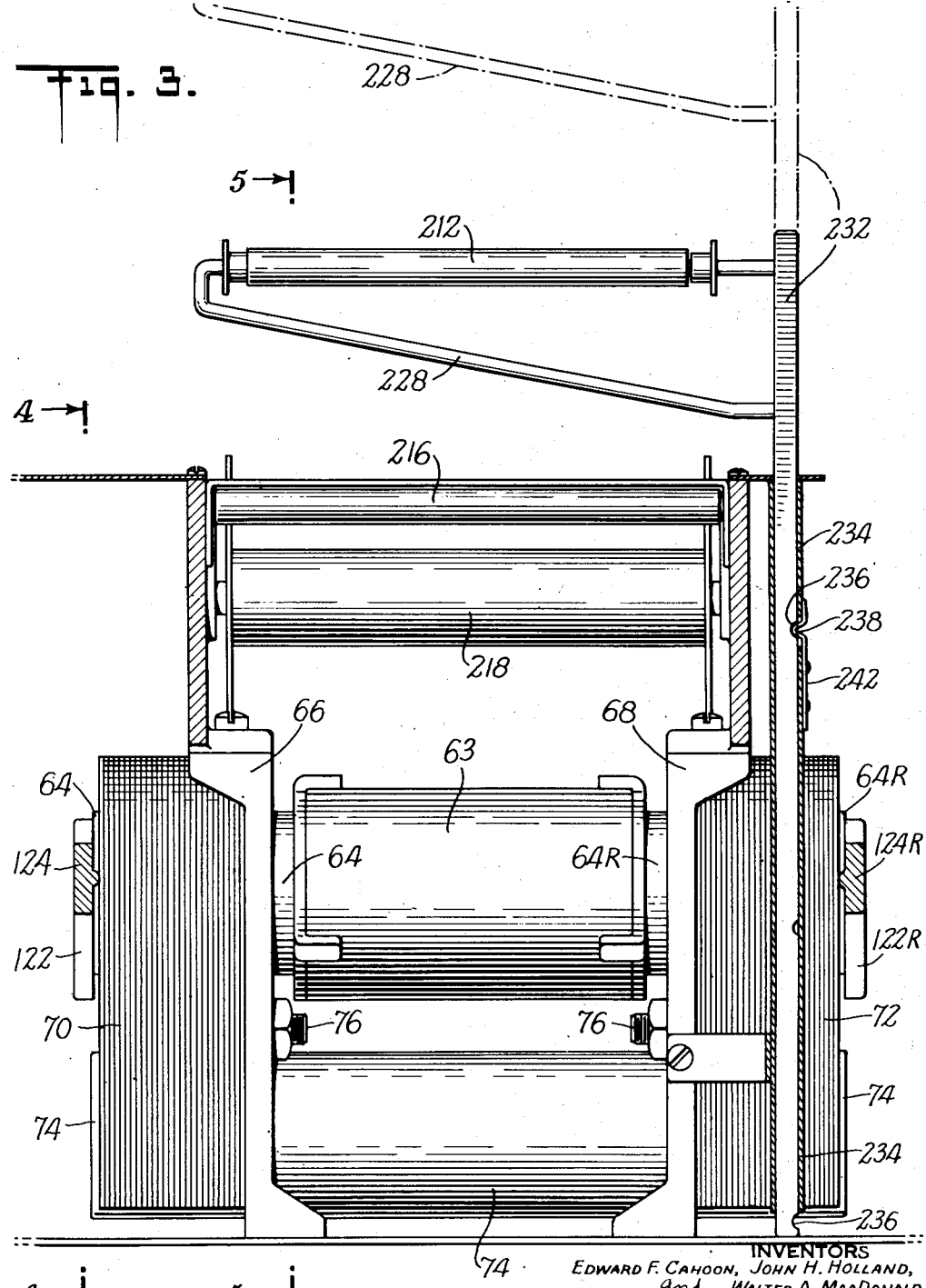

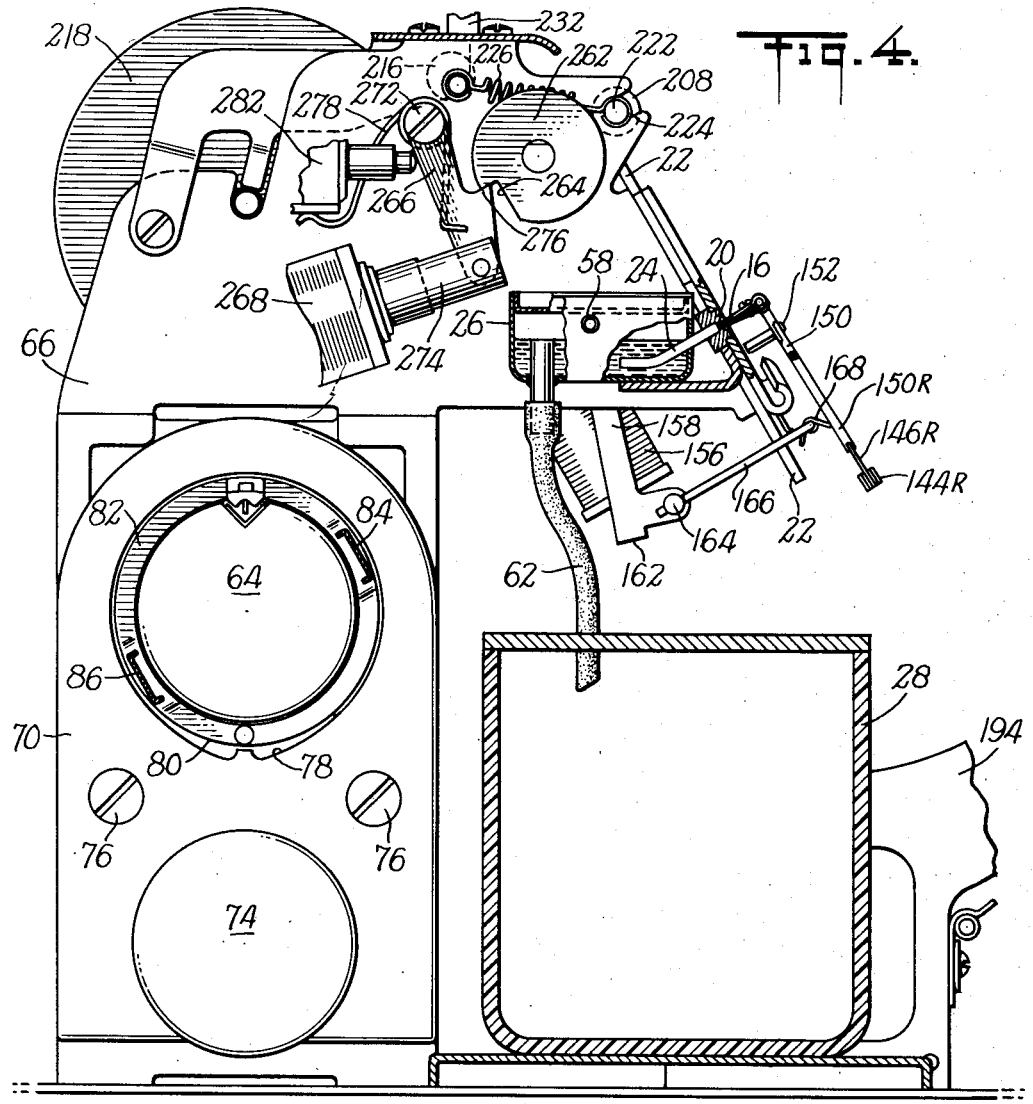

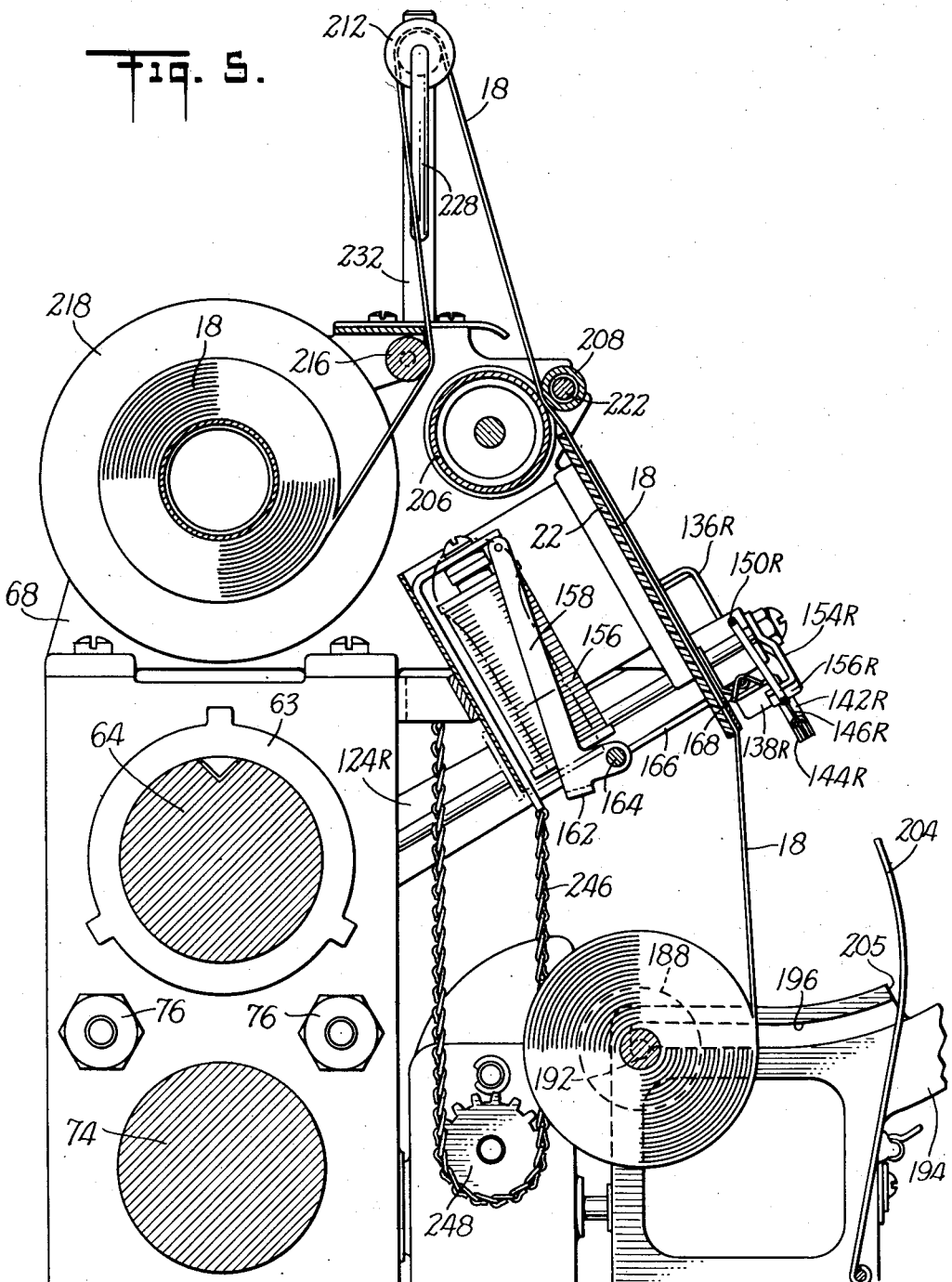

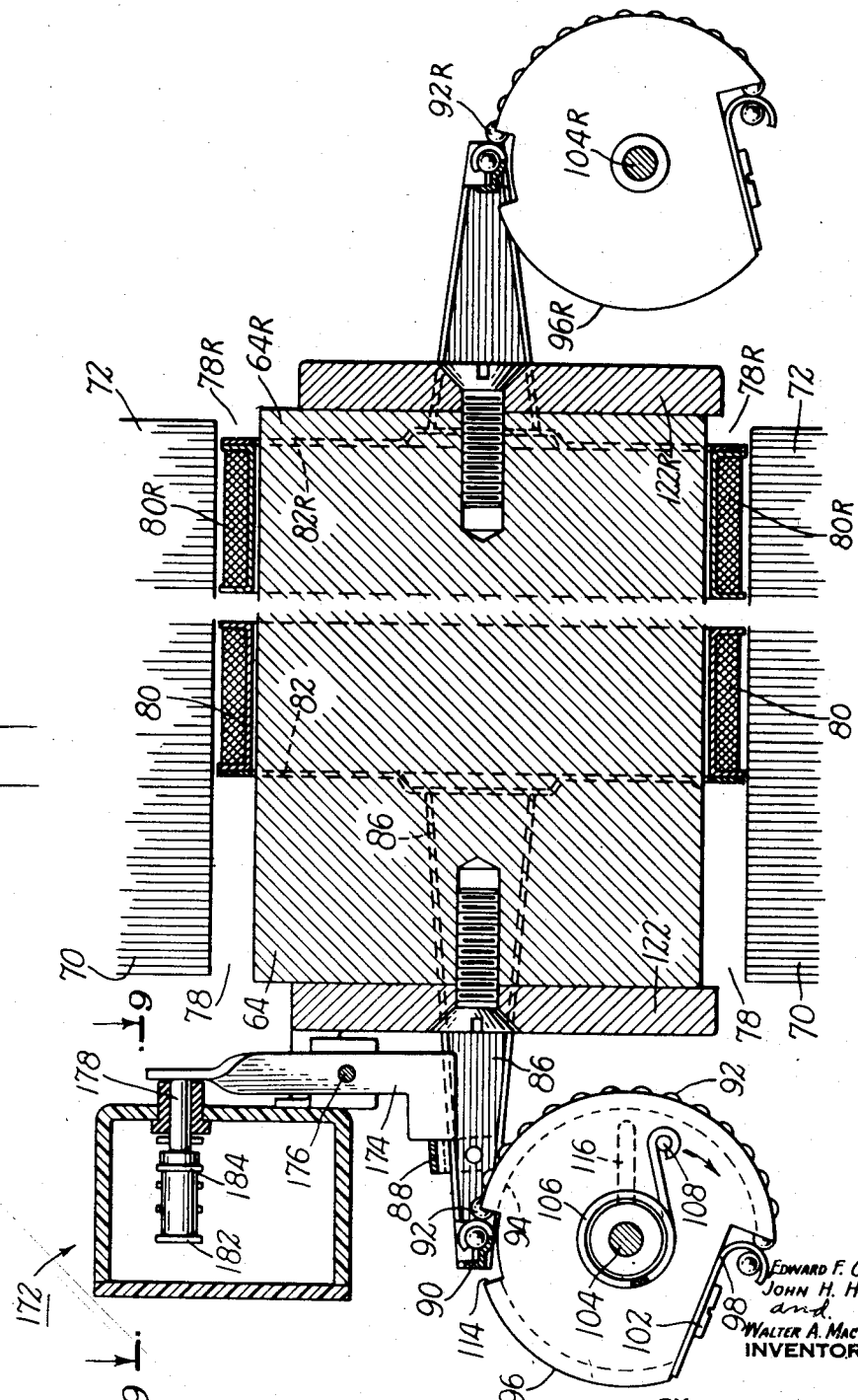

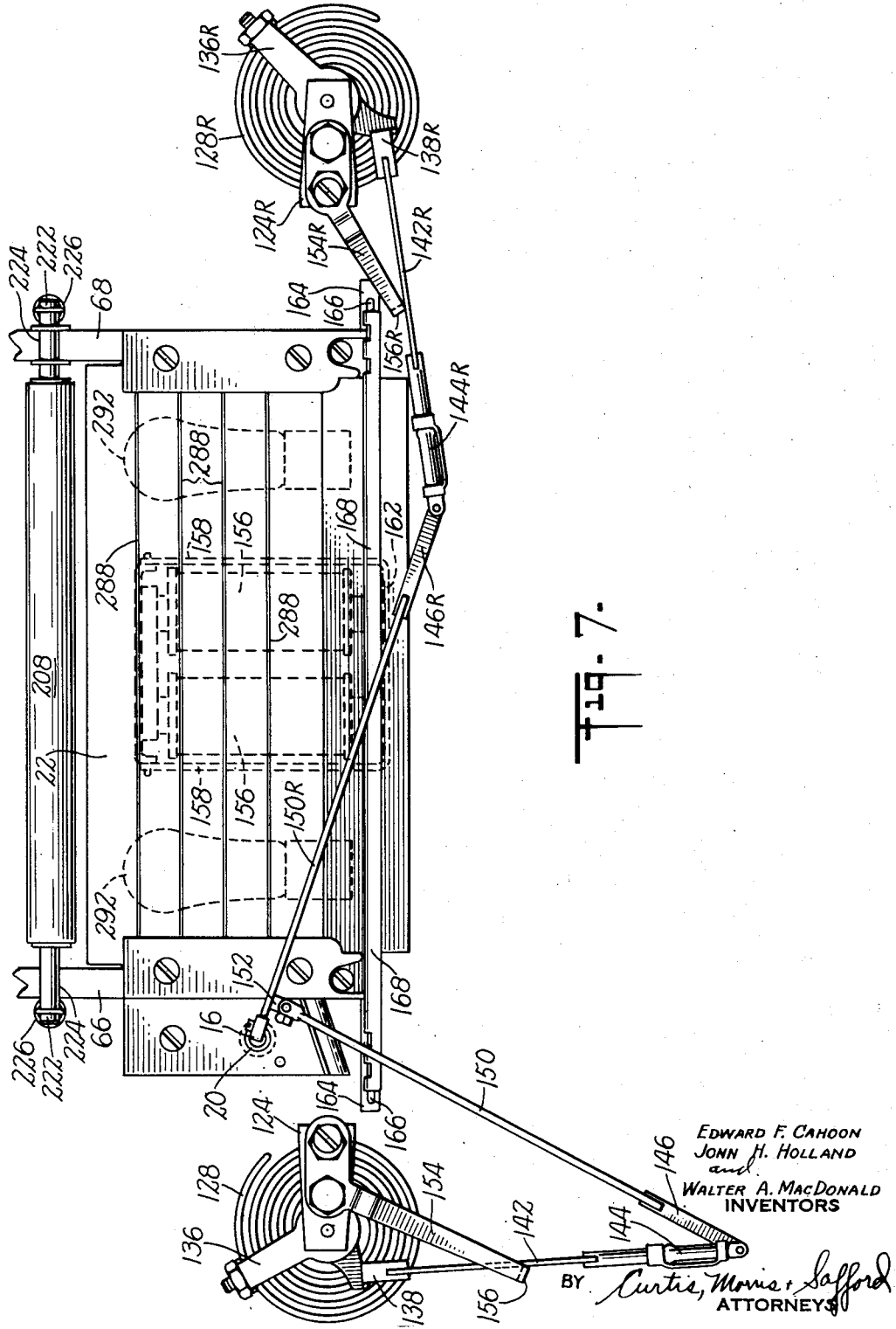

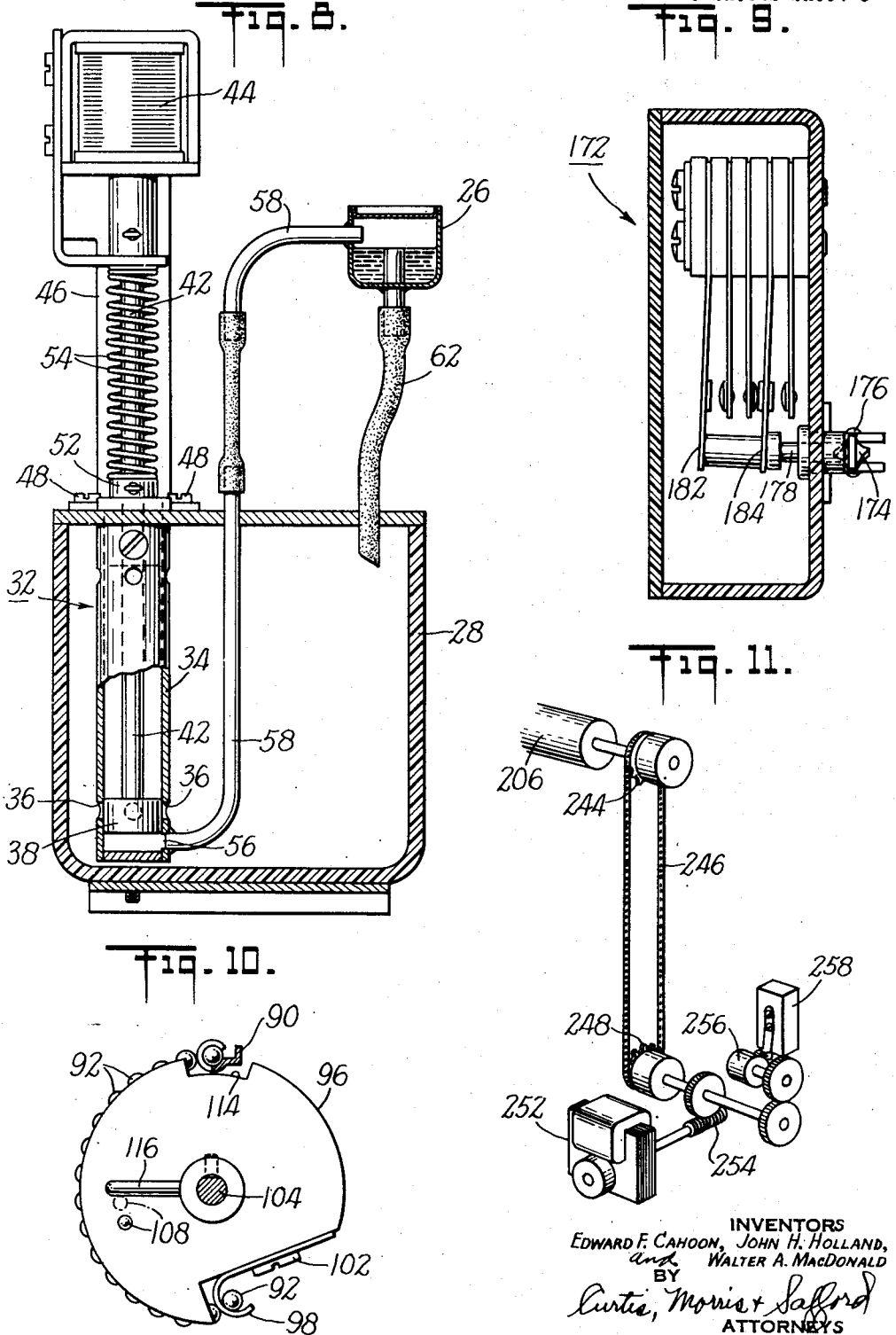

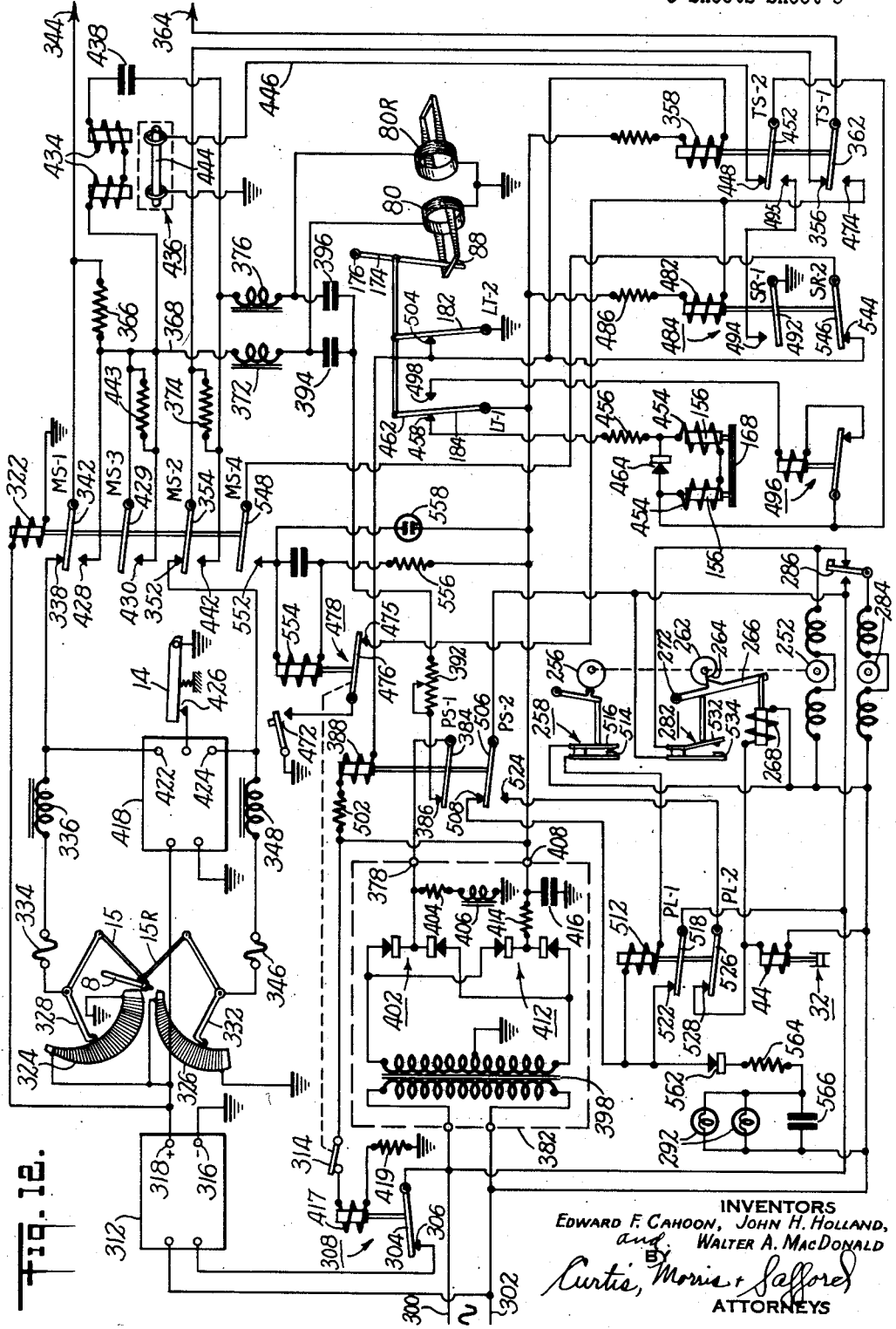

United States Patent Office 2,711,442
Patented June 21, 1955

2,711,442

TELESCRIBER

Edward F. Cahoon, West Nyack, and John H. Holland and Walter A. MacDonald, New York, N. Y., assignors to Telautograph Corporation, New York, N. Y.

Application September 20, 1950, Serial No. 185,872

12 Claims. (Cl. 178—19)

This invention relates to telescribers for the transmission of graphic characters from one location to another. More particularly, the invention is directed to improving the fidelity of reproduction, and to the simplification and improvement of the telescriber structure.

In telescriber systems of this type, two writing signals are transmitted corresponding, respectively, to two coordinates defining the position of the writing stylus in a plane parallel to the writing surface. A third "on-off" signal is transmitted to indicate whether the writing stylus is in contact with or lifted above the writing surface, so that discontinuous traces can be transmitted. Two additional signals also are provided, one for shifting the paper at the receiver and another for controlling a signal buzzer. In the present system, an automatic switch is provided at the receiver which permits the transmission lines connecting the transmitter and receiver to be used for signaling, paper-shifting, or other functions when writing signals are not being transmitted, but switches the circuits for the reception of writing signals whenever such signals are present on the incoming lines.

The faithfulness of the reproduction by the receiver is limited by the inertia of the moving parts of the pen driving system and in particular by the static friction of these parts. Accordingly, it has been the practice to reduce the static friction by superimposing upon the writing signals a higher frequency pulsating signal, of small magnitude relative to the writing signals, which causes the moving parts of the pen driving system at the receiver to vibrate continuously but with such small magnitude that the vibratory movement does not interfere materially with the reproduction of the transmitted trace. In the present system, a pulsating signal of much higher magnitude is utilized and which is not superimposed upon the transmitted writing signals, but which is applied directly to the pen driving motors at the receiver. A simple but highly efficient mechanical filter is utilized to prevent this pulsating signal from interfering with the reproduced trace.

The present arrangement also includes a platen having illuminated guide lines, or other indicia, so that when the operator is sending a message, the illuminated guide lines of the local receiver, which under these circumstances serve as a monitor, can be used to direct the movements of the transmitting stylus. This is made possible by the use of a thin resilient translucent platen having an opaque surface with the guide lines engraved thereon. The guide lines are adjacent the back surface of the paper strip on which the message is being recorded, thus eliminating parallax without requiring a parallel-beam light transmission system, and the resiliency of the thin plastic platen absorbs the energy from the pen as it drops on the surface of the paper, thus preventing the pen from bouncing or skipping and causing an incorrect or incomplete trace.

Other aspects, objects, and advantages of the invention, for example, relating to the paper handling apparatus, will be in part pointed out in, and in part apparent from, the following description of a telescriber transceiver embodying the invention considered in connection with the accompanying drawings, in which:

Figure 1 is a perspective view of a telescriber transceiver for the transmission and reception of graphic characters, part of the case being cut away to show the arrangement of certain parts;

Figure 2 is an end view of the receiver portion of the transceiver with the case removed;

Figure 3 is a sectional view taken along line 3—3 of Figure 2;

Figure 4 is a sectional view taken along line 4—4 of Figure 3;

Figure 5 is a sectional view taken along line 5—5 of Figure 3;

Figure 6 is an enlarged sectional view, with the center portion deleted, taken along line 6—6 of Figure 2;

Figure 7 is an enlarged sectional view taken along line 7—7 of Figure 6;

Figure 8 is an enlarged sectional view taken along line 8—8 of Figure 2;

Figure 9 is a sectional view taken along line 9—9 of Figure 6;

Figure 10 is an enlarged sectional view along line 10—10 of Figure 2;

Figure 11 is a perspective view of a portion of the paper shifter mechanism; and Figure 12 is a schematic diagram of the electrical circuits of the transceiver shown in the above drawings.

Figure 1 shows a combination transmitter and receiver, called a transceiver, for the transmission of graphical characters from one point to another. The transmitting portion of the transceiver is positioned near the front of the machine in the space generally indicated at 2, and the receiving apparatus is positioned near the rear of the machine, in the space generally indicated at 4. The entire machine is housed in a case 6 of metal or plastic which is provided with the necessary openings or doors to permit convenient access to the operating parts of the transceiver.

This transceiver can be connected to one or more other transceivers or receivers positioned at distant points. The characters to be transmitted are traced with a stylus 8, which is free to move over the upper surface of a platen 14. The stylus 8 is connected by linkage members 15 and 15R which control the signal generating portion of the transmitter in accordance with the position of the stylus 8 on the platen 14. At a distant receiver, these signals effect the reproduction of the graphic characters traced by the stylus 8. When signals are being transmitted to a distant receiver, the local receiver 4 operates as a monitor so that the operator can see exactly what is being reproduced at the distant receiver. This reproduction is accomplished by a recording pen 16 which reproduces the transmitted characters on a strip of paper 18, which is shown in Figure 5, but which has been omitted from the showing of Figure 1 in order to better illustrate certain parts of the transceiver.

The stylus 8 is connected by the linkage mechanism 15 and 15R to a pair of potentiometers (shown only in the schematic diagram of Figure 12) by means of which two writing-signal voltages are produced in accordance with the position of the stylus 8 on the platen 14. These potentiometers and the stylus linkage mechanism are similar to those described by Tiffany in U. S. Patent 1,770,761. The recording pen 16, at the receiver, is operated by a similar linkage mechanism which will be described later.

In order to permit transmission of a discontinuous trace, a pressure-operated switch (shown only in diagrammatic form in the electrical circuits of Figure 12) is positioned beneath the platen 14, which is hinged at the forward edge, and arranged so that when the stylus 8 is lifted from the platen 14, the reduced pressure operates the switch to actuate a pen-lifter circuit and lift the recording pen 16 from the surface of the paper 18. This under-platen switch arrangement is similar to that described by Lauder et al. in U. S. Patent 2,355,087.

*Ink supply system for recording pen 16*

(Figures 1, 4, 7, and 8)

In order to provide ink for the recording pen 16, an inkwell 20 (Figures 4 and 7) is provided adjacent the receiver platen 22. This inkwell 20 is supplied with ink through a capillary tube 24 which leads into an ink tank 26. The ink in this tank 26 is periodically replenished from a larger ink reservoir 28, positioned as shown in Figure 1, by means of a solenoid-operated pump, generally indicated at 32 in Figure 8. This pump includes a cylinder 34, extending from the bottom to the top of the reservoir 28, which has two or more inlet ports 36 near its lower end through which ink stored in the reservoir enters the cylinder 34. A piston 38 is slidably fitted within the cylinder 34 and is connected by a rod 42 to a solenoid 44 supported by a bracket 46, which is secured to the upper surface of the tank 28 by screws 48. A collar 52 is keyed to the rod 42 and is arranged to strike the upper surface of the ink reservoir 28 to limit the downward movement of the rod 42 and piston 38. A compression spring 54 surrounds the shaft 42 and is held in compression between the collar 52 and an upper portion of the supporting bracket 46. This spring returns the piston to its lower position when the solenoid 44 is de-energized.

An outlet port 56 near the bottom of the cylinder 34 is connected by tubing 58 to the smaller ink tank 26. An over-flow pipe 62 extends into the ink tank 26 and communicates with the reservoir 28 to control the level of ink in the tank 26.

In operation, when the solenoid 44 is energized, the rod 42 is pulled upwardly, compressing the spring 54 and allowing ink from the reservoir 28 to enter the cylinder 34 through the inlet ports 36. When the solenoid 44 is de-energized, the spring 54 forces the piston 38 downwardly, closing the inlet ports 36 and forcing a small quantity of ink through the tube 58 into the tank 26. The displacement of the piston 38 is larger than the total volume of the tubing 58 so that a sufficient quantity of ink is pumped into the tube 58 each time the piston 38 is actuated to completely fill this tube and eject a small quantity of ink into the ink tank 26. As will be explained more fully later, this solenoid 44 is connected so as to be actuated automatically during the operation of the receiver and keeps the ink tank 26 continually filled to the level of the over-flow pipe 62.

The reservoir 28 may be constructed of any suitable material, for example of plastic which is preferably transparent so that the ink supply can be observed visually. This large reservoir of ink permits the receiver to operate for long periods of time without attention. The ink supply can be replenished conveniently as part of the regular servicing operation so that it is not ordinarily necessary for the user of the apparatus to replenish the ink supply.

*Pen driving system*

(Figures 2, 3, 4, 6, and 7)

A moving coil system is utilized to operate the recording pen 16. A steady magnetic field for operation of the moving coils is produced by a permanent bar magnet 63 (Figure 3) which extends cross-wise of the receiver near the rearward portion thereof. This magnet is connected at each end by soft iron pole pieces 64 and 64R supported by two upright frame members 66 and 68, which may be castings of non-magnetic metal. The magnetic circuit is completed through two vertically laminated core members 70 and 72 which surround the ends of pole pieces 64 and 64R and are connected at the bottom by a cylindrical cross bar 74 of soft iron. The core members 70 and 72 are secured to and supported by the frame members 66 and 68 by bolts 76.

An annular space 78 and 78R (Figure 4) is provided between the outer surface of the pole pieces 64 and 64R and each of the laminated core members 70 and 72 along which the pen-operating coils 80 and 80R move; these coils are referred to, respectively, as left and right "buckets."

Because a substantial amount of force is required to operate the recording pen, it is necessary to have a relatively high field strength surrounding the buckets 80 and 80R. It has been customary, therefore, to utilize two bar magnets in the construction of the field-producing system, and a strong permanent magnet to aid the magnet 63 was used in place of the soft iron bar 74.

The present structure is such that the additional magnet can be eliminated, and the soft iron bar 74 can serve as a structural member to brace the frame members 66 and 68. This is accomplished by assembling the soft iron bar 74, the core members 70 and 72, and the magnet 63, which is not magnetized at the time the structure is assembled. After the structure has been assembled, the bar 63, which may be formed for example of Alnico 5 or similar material, is magnetized. This is not difficult to do because the shunt magnetic circuit formed by the core members 70 and 72 and the iron bar 74 has a relatively high reluctance, because of the two series air gaps formed by the annular spaces 78 and 78R between the pole pieces 64 and 64R and the core members 70 and 72, respectively. After the bar 63 is magnetized, it provides adequate field strength so long as the magnetized structure is not taken apart. This construction makes it unnecessary to provide an external casing to support the magnetic structure and permits the soft iron bar 74 to serve also as a structural support.

The current through the left bucket 80 is controlled in accordance with the position of the writing stylus 8 at the transmitter and the bucket 80 assumes a position longitudinally along the space 78 in accordance with the magnitude of this current. In order to transmit the movement of the bucket 80 to the recording pen 16, the bucket winding is supported by an annular frame 82 which is connected to a yoke formed of two tapered channel members 84 and 86 (Figures 4 and 6). These channel members are connected to opposite sides of the frame 82 and extend outwardly through the annular opening 78. Beyond the end of the magnet 64, the channel members 84 and 86 are connected by two parallel, spaced, cross-members 88 and 90.

A ball-type chain 92 is secured to the center of cross-member 90 and extends around a peripheral groove 94 (see also Figure 2) in a cam 96 and is secured at its opposite end to a slotted end portion of a member 98 which is fastened in a recess in the cam 96 by a screw 102.

The cam 96 is rotatably mounted on a pen-operating drive shaft 104 and is coupled thereto by a coil spring 106, one end of which is secured to the surface of cam 96 by a forwardly-extending anchor pin 108, the other end of which is secured to a collar 112 that is keyed to the shaft 104. This spring tends to rotate the cam 96 relative to the shaft 104 in the direction indicated by the arrow in Figure 6.

The cross-member 90, at the point where the ball chain 92 is secured to it, rests in a notch 114 in the cam 96. Rotary movement of the cam 96 in the direction of the arrow (Figure 6) is limited when the outer wall of the notch 114 abuts the cross-member 90, the bucket and yoke assembly being in its innermost position. When the bucket 80 is energized with current of the correct polarity, the left bucket assembly moves toward the left as viewed in Figure 6, placing the ball chain 92 under tension and rotating the cam 96 in a direction opposite to that indicated by the arrow, this movement tending to wind up the spring 106. During the initial rotation of cam 96 the pen-operating drive shaft 104 remains stationary until the anchor pin 108 (Figure 10) which also extends outwardly from the rear face of the cam 96, strikes an arm 116, which is keyed to and extends radially from the shaft 104. Any further rotation of cam 96 exerts a corresponding rotary force on the shaft 104.

As best shown in Figure 2, the shaft 104 is rotatably mounted at its lower end in a bearing 117 supported by an arm 118 of a bracket 122, of non-magnetic material, secured to the end face of the bar magnet 64. This bracket 122 is provided also with a forwardly-extending arm 124 which supports a pivotal bearing 126 for the forward end of shaft 104.

A spiral spring 128 (best shown in Figure 7), which is substantially heavier than the spring 106, biases the shaft 104 for rotation in a clockwise direction as viewed in this figure. This spring is secured at its inner end to a collar 132 (Figure 2) which is fastened to the shaft 104 by a set screw 134, and at a point near its outer end to an L-shaped arm 136 which is supported by the bracket arm 124.

In order to link the shaft 104 with the pen 16, an arm 138, which is rigidly secured to and extends outwardly from the collar 132, engages the end of a flat spring member 142 which is hinged by a forked member 144 to a shorter flat spring member 146, whose widest dimension lies in a plane perpendicular to the widest dimension of the spring 142. The shorter spring member 146 is connected through the pen-linkage arm 150 and a pivotal joint 152 to the "right" pen linkage arm 150R that supports the pen 16, and which is linked to a second pen-actuating mechanism positioned on the opposite side of the receiving apparatus and which is generally similar in structure to the linkage mechanism just described, similar parts being referred to by similar numbers followed by the suffix "R" to indicate that they are corresponding right-hand members.

As shown in Figure 6, the right hand bucket assembly includes a right bucket winding 80R supported by a frame 82R which is connected to a ball chain 92R by a yoke arrangement substantially identical with that already described. It will be noted that in the normal resting position of the pen 16, that is, with the pen positioned in the inkwell 20, that the left-hand bucket 80 is positioned at its innermost position, toward the center of the bar magnet 64, while the right-hand bucket 80R is positioned at its outermost position, near the outer end of the bar magnet 64.

The ball chain 92R is secured to the cam 96R, in the manner described above, but the cam 96R, on the right-hand side of the machine, is keyed directly to the pen-operating drive shaft 104R. The supporting structure for the shaft 104R and the spiral biasing spring 128R (Figures 2 and 7) are arranged in a manner substantially identical with that already described. The shaft 104R is connected to the pen 16 through a flat spring member 142R which is connected by a hinge to the shorter flat spring member 146R, which is, in turn, connected to the pen 16 through the rod 150R.

Fixed arms 154 and 154R are provided to limit the movement of the pen-supporting linkage so that when no signals are being received by the buckets 80 and 80R, the pen 16 will rest in inkwell 20. The arm 154 is secured to the bracket arm 124 and is provided with an over-hanging end portion 156 against which the spring member 142 abuts to limit the clockwise rotation of the shaft 104. On the right-hand side of the machine, the corresponding arm 154R is supported by the bracket arm 124R and limits the clockwise rotation of the shaft 104R.

In order to reduce the friction of the pen driving arrangement, it has been customary to apply a pulsating voltage to the lines feeding the buckets 80 and 80R. This voltage, which may be a 120 cycle signal, produces a continuous tremor or shaking of the buckets 80 and 80R and the pen linkage system, thus reducing the static friction of the system. However, it has been found that improved results can be obtained by feeding the pulsating or "shake" voltage directly into the buckets and using a much larger value of shake voltage than has heretofore been used. For example, previous machines have used a shake voltage of approximately two volts across each of the buckets 80 and 80R, whereas in the present receiver approximately nineteen volts of shake signal is impressed across each bucket. This magnitude of shake voltage would cause the pen 16 to trace an irregular line with the linkage arrangement formerly in use. Accordingly, a simplified and highly efficient mechanical filtering action has been obtained by the use of the flat spring members 142 and 142R as linkage elements of the stylus driving arrangement. The resiliency of these arms is adjusted, with consideration for the inertia of the linkage system, so as to substantially damp out the 120-cycle frequency so that the line traced by the pen 16 is not objectionably irregular, but the frictional drag of the pen-driving system is reduced materially. The circuits for the application and isolation of the shake voltages will be described later.

Pen-lifting arrangement

In order to lift the pen 16 from the paper strip 18, so that a discontinuous trace can be received, two parallel-connected electromagnets 156 are positioned beneath the receive platen 22 (Figures 5 and 7) and are so arranged that when energized they lift the recording pen 16 from the paper 18. A movable armature assembly comprises two pivotally mounted armature-supporting arms 158 connected by a magnetizable armature 162 that extends across the face of the electromagnets 156. The armature 162 supports a cross-member 164, each end of which is connected by a rod 166 to a pen-lifter bar 168.

When the magnets 156 are energized, the armature 162 is pulled forwardly and upwardly moving the rods 166 longitudinally and lifting the pen-lifter bar 168 away from the platen 22. The pen-lifter bar 168 strikes the pen linkage members 150 and 150R and lifts the recording pen 16 from the surface of the paper 18, this movement of the pen linkage members being permitted by the spring members 146 and 146R. The operation of these pen-lifter magnets is controlled by the under-platen switch, which as mentioned above is positioned beneath the writing platen 14.

Left-lever turn-on switch (Figures 2, 6, and 9)

In some installations, where the various transmitters and receivers are located near each other, it is not difficult to connect the various machines with as many wires as is desired. However, when the transmitter and receiver are located at a considerable distance, it is important to eliminate as many of the connecting wires as possible. For example, when telephone circuits are employed for the transmission of graphic characters, it is desirable that not more than two lines be required between the transmitter and receiver. However, there are several functions which must be performed by these two wires. For example, separate writing signals must be transmitted for the left and right hand buckets, a signal must be provided for lifting the pen from the paper so that a discontinuous trace can be transmitted, and another signal must be provided for shifting the paper at the receiver. In addition to the above functions, it is desirable to provide a signaling arrangement so that the operator at a transmitter can signal to the operator at one or more receivers that a message is about to be transmitted. Moreover, in systems employing several transmitters and receivers, an interlock system must be provided which will prevent two transmitted signals being received simultaneously on the same receiver, for this would destroy both messages and perhaps damage the receiving equipment.

Accordingly, the interconnecting lines are used for signaling and interlocking functions prior to the transmission of the message, and a switching mechanism at the receiver connects these lines for the transmission of the writing and pen-lifting signals during the transmission of the graphic message. Because the receiver is frequently unattended, the present structure provides an automatic switching arrangement whereby these lines are switched at the start of each message.

This switching function is accomplished by means of a "left-lever turn-on switch," generally indicated at 172 in Figure 6, which is actuated by the left bucket 80. The cross-member 88, which extends between two channel members 84 and 86, is positioned to strike the end of a switch-operating lever 174, pivotally mounted at 176, and upon rotation in a counter-clockwise direction to press a slidably mounted switch pin 178 inwardly of the switch 172 against the force of spring contact members 182 and 184 (see also Figure 9).

When the transmitter is not energized, so that no signal is being impressed on the bucket 80, the spring 106 forces the bucket 80 to its innermost position causing the cross arm 88 and lever 174 to actuate the switch 172 so as to connect the transmission lines between the transmitter and receiver for signaling and interlock purposes. In this embodiment, the automatic switching circuits are associated with the "right" line 364, and the left line remains in condition for receiving writing signals and actuating the left-lever turn-on switch.

When the transmitter, which is connected to the receiver through the "left" transmission line 344, is energized, and the writing stylus 8 is in the unison position, which is necessary to energize the writing circuits of the transmitter as described in the above-identified Lauder patent, a signal voltage is applied to the "left" bucket 80 which causes it to move outwardly a short distance. This movement of cross-arm 88 releases the lever 174 and permits the switch 172 to return to its normal position in which the "right" interconnecting line 364 is connected for the transmission of the writing signals.

This initial movement of the bucket 80 rotates the cam 96 against the force of the spring 106, but does not rotate shaft 104 because the portion of the anchor pin 108 extending from the rear of cam 96 is not in contact with the arm 116. Therefore, the bucket movement that transfers the receiver from signal-receiving to message-receiving condition does not move the recording pen 16 out of the inkwell 18. Any further outward movement of the bucket 80, after the pin 108 strikes the arm 116, produces a corresponding rotation of the pen-operating shaft 104. The electrical circuits associated with the left-lever turn-on switch will be described later.

*Paper-shifting arrangement*

(Figures 1 to 5 and 11)

The roll of paper 18, on which the messages are to be written by the recording pen 16, is mounted on a reel 188 which is rotatably supported by a shaft 192 the ends of which are supported by two upwardly-extending brackets 194 (Figure 2). Each of the brackets 194 (only one of which is shown in the drawings) is provided with an arcuate groove 196, having a bearing portion 198 adapted to receive one end of the shaft 192. This roll of supply paper may be inserted in the receiver by opening a hinged cover plate 202 in the case 6 (Figure 1) and swinging downwardly a pivotally mounted shield 204 (Figure 5) and sliding the ends shaft 192 of the reel 188 downwardly along the arcuate grooves 196. The brackets 194 are provided with cut-out portions as shown at 205 in Figure 2 to permit passage of the pen-driving linkage members.

The paper strip 18 extends from the front of reel 188 upwardly over the upper surface of the writing platen 22 (Figure 5) between a friction drive roller 206 and a pressure roller 208, thence over an idler roller 212, and downwardly around a second idler roller 216 to a takeup reel 218.

The paper-handling mechanism is supported by the two upright frame members 66 and 68 which support the drive and idler rollers and the platen assembly. The pressure roller 208 is supported by a shaft 222 (Figure 4) which extends from each end of the roller 208 and is positioned in recesses 224 in the frame members 66 and 68 and is maintained with a firm pressure against the surface of drive roller 206 by means of two tension springs 226 secured at one end to the shaft 222 and at their opposite ends to frame members 66 and 68, respectively.

As best shown in Figure 3, the idler roller 212 is rotatably mounted on a triangular wire framework 228 supported from an upright post 232. This idler roller causes the paper to pass upwardly above the surface of the case 6, so that the messages most recently received are visible from the front of the receiver. The post 232 is adjustably positioned in a channel 234 supported by the frame member 68. One surface of the post 232 is provided with spaced horizontal grooves as at 236 into which is adapted to fit an inwardly projecting portion 238 of a leaf spring 242 secured to the channel 234 to form a detent so that the post 232 can be adjusted to and locked at any one of several heights. With the post 232 in its uppermost position, a considerable number of messages will remain visible, but for applications where it is not necessary to observe more than one or two earlier messages, the post 232 can be placed in one of the lower positions.

The paper drive roller 206 (Figure 11) is driven by means of a sprocket 244 connected by a chain 246 to a lower sprocket 248 that is driven by an electric motor 252 through a worm drive assembly 254. The motor 254 is arranged also to rotate a switch-operating control cam 256 that operates a switch 258 to control the paper movement as will be described later.

A cam 262 (Figure 4) having a notch 264 is secured to the other end of the paper drive roller 206, adjacent which is positioned a follower-arm or a pawl 266 that is controlled by a solenoid 268. The pawl 266 is pivotally supported at 272 and is secured at its other end to an armature 274 of the solenoid 268. A shoulder 276 on the solenoid-controlled pawl 266 stops the rotation of the paper feed roller 206 at the position indicated, whenever the solenoid is not energized, the pawl being urged toward the locking position by a wire spring 278. A switch 282, forming part of the paper-shifting control circuits, is operated by the pawl 266. This switch, the solenoid 268, the switch 258, and the electric drive motor 252, are all connected into the paper-shifting circuit which will be described later.

The take-up reel 218 is driven by an electric motor 284 (shown only in the circuit diagrams in Figure 12), which is connected to operate simultaneously with the paper-shifter motor 252, and is provided with a friction drive clutch (not shown) which permits the take-up reel to keep the paper strip 18 under constant tension without over-loading the motor 284 or tearing the paper. A manually operable switch 286 (Figure 1), extending from the top of the case 6 is provided so that the take-up reel can be driven separately from the paper-shifter motor when desired.

*The recording platen*

(Figure 7)

The recording pen 16 is lifted by the bar 168 from the surface of the paper strip 18 when the writing stylus 8 is lifted from the writing platen 14, and is dropped upon the writing surface when pressure is again exerted on the transmitter platen 14. The surface of the recording platen 22, therefore, must be such as to prevent the pen from bouncing and causing an incomplete or irregular line when the pen is dropped onto the surface of the paper on which the message is being recorded. For example, if the platen were formed of metal, then pen would bounce when it struck the surface of the paper and cause a broken or incomplete line. To overcome this, the platen has ordinarily heretofore been formed with a central opening over which the paper is stretched so that the resiliency of the paper damps out any bouncing tendency of the recording pen 16. A light placed behind this opening will provide a light for the writing surface, but it will not provide any guide lines or other indicia to assist the operator in writing the message. Such guide lines or indicia could be provided by a projection system, but such systems are expensive and to provide the parallel rays necessary to prevent parallax would require more space than is available in a commercial machine. In the present machine, this problem has been solved by making the recording platen 22 from a thin resilient sheet having energy absorption characteristics. A thin sheet of plastic has been found to absorb the energy from the pen 16 as it strikes the surface and to eliminate bouncing. The plastic sheet which forms the platen 22 may be translucent and has a black coating adjacent the paper 18. Guide lines 288, for directing the writing movements of the operator during transmission, may be engraved in the opaque coating of this thin plastic platen 22 and permit the light from lamps 292, positioned behind the platen 22, to shine through, or opaque lines may be inscribed on the uncoated translucent plastic. These marks are formed on the surface of the plastic adjacent the paper sheet so that it is not necessary to utilize a parallel beam light source in order to prevent parallax. It is understood, of course, that other indicia or forms of guide marks can be engraved on the platen in accordance with the particular application of the machine. The lamps 292 are energized with direct current in order to eliminate vibration of the filaments which would be produced because of the stray magnetic field surrounding the lamps if alternating current were used.

*The electrical circuits*

(Figure 12)

The electrical circuits include not only an arrangement for transmitting the graphic characters from the local transmitter to the distant transmitter, but also provide for the signaling between the transmitter and the various receivers and for shifting the paper at the receivers. An interlock system is provided to prevent interference between the transmitter and the receiver. It is to be understood, of course, that the particular signaling and interlock arrangement which is to be used will depend upon how many transmitters and receivers are being used and the operating arrangement desired between them. Accordingly, a typical system has been shown in the drawings and one in which only two lines extend between the local transceiver and the distant station. Only the circuits of the transceiver are shown because the receiver portion of the local transceiver is identical with the distant receiver.

The various relays and switches throughout the circuit are shown in the position which they occupy during the time writing is being transmitted from the local transmitter to a distant station.

*The writing circuits*

As shown in Figure 12, the transmitter and local receiver are operated by alternating current from conventional supply lines 300 and 302. The line 300 of the A.-C. power mains is connected through an armature 304 and a fixed contact 306 of a unison relay, generally indicated at 308, to a transmitter power supply, indicated in block form at 312, which includes the usual transformers, rectifiers, and voltage regulator circuits, and which is connected directly to the supply line 302. The unison relay is controlled by a unison switch 314. This switch is positioned adjacent the transmitter platen 14 and is operated by pressing a control button (not shown) with the tip of the transmitter stylus 8. This switch is ratchet-controlled so that successive actuations of the control button alternately open and close the switch contacts. The switch is arranged so that it can be operated only by the stylus 8, substantially as described in connection with the unison switch in the above-mentioned Lauder et al. patent.

The negative output terminal 316 of the power supply 312 may be connected as indicated to a common ground circuit, which is used also as the return circuit between the local and distant stations.

The positive output terminal 318 of the power supply 312 is connected to the actuating winding 322 of a master relay, which controls a number of switches indicated at their respective places in the drawings as MS-1, MS-2, etc. During the time that graphic characters are being transmitted, that is, when the unison switch 314 is closed, this winding 322 is energized and accordingly the "MS" switches operated thereby are shown in the positions which they assume when this winding is energized.

The voltage from this power supply is applied also across "left" and "right" potentiometers, indicated at 324 and 326, respectively, the movable contacts 328 and 332 of which are controlled by the movement of the writing stylus 8. The stylus linkage mechanism of the transmitter and the potentiometers 324 and 326 are substantially as described in U. S. Patent 1,770,761 to Tiffany.

The movable contact 328 of the "left" potentiometer 324 is connected through a protecting fuse 334 and an isolation choke 336 to a fixed contact 338 on a switch MS-1, operated by the master relay winding 322, the armature 342 of which is connected to a transmission line 344 leading to the distant receiver, and which is called the "left" line.

The movable contact 332 of the "right" potentiometer 326 is connected through a protective fuse 346 and an isolating choke 348 to a fixed contact 352 of a switch MS-2, also operated by the master winding 322, the armature 354 of which is connected to a fixed contact 356 of a switch TS-1, which is operated by a transfer relay winding 358 that is energized whenever graphic characters are being transmitted or received; the energizing circuits for this transfer relay will be described later. The armature 362 of switch TS-1 is connected to the "right" line 364 which leads to the distant receiver.

Thus, when the graphic characters are being transmitted, the variable D.-C. voltages produced by the "left" and "right" stylus-controlled potentiometers 324 and 326 are connected directly to the "left" and "right" lines 344 and 364 for transmission to the distant receiver.

Because the "left" and "right" lines may be connected at the distant station to a transceiver identical with that represented by Figure 12, the action at the distant receiving end may be explained by assuming that signals are being received locally on the "left" and "right" lines and that all of the various switches have been changed to the receiving position, as will be described later.

During transmission, the local receiver is utilized as a monitor so that the operator can see the characters on the local receiver exactly as they are being reproduced at the distant station. Thus, the signal from the stylus-controlled contact 328 of the "left" potentiometer 324 is connected also from the "left" line 344 through a resistor 366, which may have a value of 1200 ohms, a lead 368, and an isolation choke 372 to one terminal of the "left" bucket 80 of the local receiver. The other terminal of this bucket is connected to the common ground circuit.

The signal from the "right" stylus-controlled potentiometer contact 332 is connected through a resistor 374, having a value equal to the resistor 366 in the other side of the line, and an isolation choke 376, to one terminal of the "right" bucket 80R of the local receiver. The other terminal of this bucket is connected to the common ground circuit. Thus, the stylus-generated voltages are applied also to the two buckets of the local receiver and control the movement of the recording pen 16, as described above.

The "shake" voltage

Whenever the writing voltages are impressed on the buckets 80 and 80R of the receiver, a pulsating "shake" voltage is simultaneously applied to the buckets to reduce the frictional drag, as mentioned above. This shake voltage is delivered from an output terminal 378 of a receiver power supply 382, through the armature 384 and contact 386 of a switch PS-1, operated by a paper-shifter relay winding 388, and a rheostat 392, for adjusting the magnitude of the shake voltage, to two coupling condensers 394 and 396 connected, respectively, to the "left" and "right" buckets 80 and 80R. As will be described later, the paper-shifter relay winding 388 is energized whenever graphic characters are being transmitted or received.

The receiver power supply 382 is connected to the A.-C. supply lines 300 and 302 and includes a transformer 398, the secondary of which is connected to a full-wave rectifier system, generally indicated at 402. The positive terminal of this full-wave rectifier system is connected to the output terminal 378 to supply the shake voltage circuit described above. A series resistor 404 and a choke 406 are connected between the output terminal 378 and ground. This resistor-choke arrangement serves to increase the effective shake voltage and operates in a manner somewhat opposite to that of the ordinary smoothing filter.

Receiver power supply and unison relay circuit

This power supply 382 also delivers a smooth D.-C. voltage to a second positive output terminal 408 which provides power for the unison relay, the transfer relay, the signaling circuits, the pen-lifter circuits, and for controlling the paper-shifter circuits in the receiver. Thus, the secondary winding of the transformer 398 is connected to a second full-wave rectifier system, generally indicated at 412, the output voltage of which is filtered by a shunt condenser 416, connected to the positive terminal of the rectifier system through a current limiting resistor 414.

The unison relay 308, which turns the transmitter "on" and "off," is controlled by the unison switch 314. The operating circuit for this relay can be traced from the positive terminal 408 of the receiver power supply 382, through the switch 314, the energizing winding 417 of the unison relay 308, and a current-limiting resistor 419 to ground. As explained above, this unison switch 314 is positioned so that it is operated by the stylus 8 and is controlled by a rachet mechanism so that the switch is maintained in either "on" or "off" positions. That is, when pressure is exerted on the control button unison switch by means of the writing stylus to turn the transmitter "on," the transmitter remains "on" until the unison control button is again depressed, after which the transmitter remains "off" until the switch is again actuated.

The pen-lifter circuit

In order to operate the pen-lifter circuits at the receiver, an oscillator, indicated in block form at 418, energized by power from the transmitter power supply 312, generates a 200-cycle signal which is applied from two output terminals 422 and 424 to the "left" and "right" lines through blocking condensers (not shown). The output signal from this oscillator is controlled by the under-platen switch 426, similar to that described in the above-mentioned patent to Lauder et al. This under-platen switch is responsive to pressure of the stylus 8 on the platen 14 and is arranged so that the oscillator 418 delivers a 200-cycle signal when the stylus 8 is pressing down on the platen 14, and prevents the delivery of the 200-cycle signal when the stylus is lifted from the platen. At the local and distant receivers, the recording pens are lifted from the writing surface whenever the 200-cycle signal is absent.

The operation of the pen-lifter circuit can be considered by assuming that a writing signal is being received by the local receiver, either from a distant station or from the local transmitter. When the writing signal is being received from a distant station, the operating circuit for the 200-cycle pen-lifter signal, which is present on the "left" and "right" lines, can be traced from the "left" line 344 through the armature 342 and a fixed contact 428 of the switch MS-1 (which is now in the other position from that shown in the drawing), armature 429 and fixed contact 430 of switch MS-3, the operating coils 434 of a vibratory relay, diagrammatically and generally indicated at 436, a condenser 438, and a fixed contact 442 and the armature 354 of the switch MS-2 to the "right" line 364. When the 200-cycle signal is being generated by the local transmitter, the circuit can be traced from terminal 422 of the signal generator 418 through the contact 388 and armature 342 of switch MS-1, the resistor 366, a resistor 443, operating coils 434, condenser 438, the resistor 374 and armature 354 and contact 352 of switch MS-2 to the other terminal 424 of the signal generator 418. This vibratory relay 436 causes continuous vibration of a contact member 444, connected between a pen-lifter control lead 446 and ground, in such manner that this circuit is completed for a very small percentage of the time. Whenever the 200-cycle signal is interrupted the pen-lifter circuit is completed through the member 444. Such a relay is described by Van Nostrand in U. S. Patent 1,817,468.

The energizing circuit for the pen-lifter mechanism can be traced from ground through vibratory member 444, lead 446, a contact 448, and an armature 452 of a transfer relay switch TS-2, energizing windings 454 of the pen-lifter magnets 156 (shown in Figure 5), a fixed resistor 456, a fixed contact 458 and an armature 462 of a switch LT-1, forming part of the left-lever turn-on switch 172, to the positive terminal 408 of the receiver power supply 382. A half-wave rectifier 464 is connected across the terminals of the pen-lifter windings 454 and suppresses arcing that would otherwise occur when the circuit is opened.

When the 200-cycle pen-lifter signal is present the vibrating member 444 does not permit enough average current to flow to energize the pen-lifter magnet windings 454, but when this signal is interrupted, the vibratory member 444 completes the circuit from the positive terminal 408 of the receiver power supply through the pen-lifter coils 454 to ground and energization of the windings 454 of the magnets 156 lifts the pen 16 from the surface of the paper 18.

The signaling circuits

In order to signal the distant station when a message is to be transmitted or to notify the receiving station that a message has been transmitted, a push button 472 is closed manually and connects the "right" line 364 to ground through armature 362 and a contact 474 of transfer relay switch TS-1, and a fixed contact 475 and an armature 476 of an interlock relay, generally indicated at 478. This grounding of the line 364 actuates a signal buzzer at the opposite end of the line, provided the receiver there is not already in use.

The operation at the distant receiver can be understood by observing the action at the local receiver and assuming that the "right" line 364 is connected to ground at the distant receiver. Grounding the "right" line 364 completes the circuit from the positive terminal 408 of the receiver power supply 382 through an energizing winding 482 of a signal relay, generally indicated at 484, and a current-limiting resistor 486, a fixed contact 474 and armature 362 of the transfer relay switch TS–1. When the signal relay winding 482 is thus energized, the signaling circuit is completed which may be traced from ground through an armature 492 and a fixed contact 494 of a signal relay switch SR–1, a fixed contact 495 and the movable armature 452 of the transfer relay switch TS–2, a signal buzzer 496, a fixed contact 498 and the armature 462 of the left-lever turn-on switch LT–1, to the positive terminal 408 of the receiver power supply 382, thus energizing the signal buzzer 496.

The paper-shifter circuits

The paper-shifter operates automatically each time the transmitter is turned off and moves the paper strip 18 a predetermined distance, usually one frame. When writing signals are applied to the receiver circuit, either from the local transmitter or from a remote transmitter, the left-lever turn-on switch is operated and closes the switch LT–2, completing a circuit from the positive terminal 408 of the receiver power supply 382 through a fixed resistor 502, the paper-shifter relay winding 388, and the fixed contact 504 and movable arm 182 of the switch LT–2 to ground. A movable armature 506 is engaged with a fixed contact 508 of a switch PS–2 by this energization of the paper-shifter winding 388 to complete a circuit from the alternating current supply line 300 through arm 506 and contact 508 of the switch PS–2, an energizing winding 512 of a second paper-shifter relay, which controls switches PL–1 and PL–2, a fixed contact 514 and movable arm 516 of the cam-operated microswitch 258 to the other A. C. supply line 302. The contacts of the microswitch 258 at this time are held in closed position by the cam 256. Once the second paper-shifter relay winding is energized, energization is maintained by a holding circuit that can be traced from the A. C. line 300 through a movable armature 518 and fixed contact 522 of the switch PL–1 of the second paper shifter relay, the energizing coil 512 of this relay and the cam-operated microswitch 258 to the other A. C. line 302.

Accordingly, when writing signals are applied to the receiver, the two paper-shifter relays are energized and remain in this condition so long as the receiver is receiving writing signals. However, when the transmitter is de-energized so that no writing signals are being received, the left-lever turn-on switch returns to its normal position, and the first paper-shifter relay winding 388 is de-energized because the switch LT–2 is now open, but the second paper-shifter relay winding 512 remains energized through its own holding circuit described above. With the first paper-shifter relay winding 388 de-energized and the second paper-shifter relay winding 512 energized, a paper-shifting circuit is completed than can be traced from the A.-C. line 300 through the movable armature 506 and a fixed contact 524 of the switch PS–2 of the first paper-shifter relay, a movable armature 526 and a fixed contact 528 of the second paper-shifter relay, the paper-shifter solenoid 268 (also shown in Figure 4) to the other A.-C. line 302. Accordingly, each time the transmitter is de-energized, the paper-shifter solenoid 268 is energized. The paper-shifter solenoid plunger is mechanically linked to a follower in the form of the pawl 266 which rides on the paper roller cam 262. The pawl 266 is arranged to actuate mechanically a movable arm 532 of the switch 282, the arm 532 is adapted to engage a contact 534 when the solenoid 268 is energized or when the pawl 266 is unable to drop into the notch 264 on the cam 262. Thus, when the paper-shifter solenoid 268 is energized, a circuit is completed from the A.-C. line 300 through the movable arm 532 and the fixed contact 534, the paper-shifter motor 252 to the other A.-C. line 302. The paper-shifter motor then drives the paper drive-roller 206 to move the paper strip 18 through the receiver. This motor 252 also drives the cam 256 to control the operation of the microswitch 258, which is in the holding circuit of the second paper-shifter relay. When this gear cam 256 reaches the position where the microswitch follower arm is on the flat of the cam, the switch 258 opens and the winding 512 of the second paper-shifter relay is de-energized. De-energization of the latter winding opens the circuit between the fixed contact 528 and the movable armature 526 of the second paper-shifter relay switch PL–2 and de-energizes the paper-shifter solenoid 268. The solenoid plunger, however, is restrained from returning to its normal "off" position by the pawl 266 which at this time is riding on the high part of the paper roller cam 262. The switch contacts 532 and 534, of the switch 282, therefore remain closed and the paper-shifter motor continues to operate, rotating the paper drive roller 206 until the pawl 266 drops into the notch 264 in the cam 262, releasing the solenoid plunger and opening the switch 282, which disconnects the paper-shifter motor 252 from the A.-C. lines. The driving arrangement is such that at the time the paper-shifter motor 252 is de-energized, the cam 256 has rotated to a position closing the contacts of the cam-operated switch 258. This paper-shifting cycle is repeated automatically each time the local or distant transmitter, whichever is connected to the local receiver, is turned off.

In order to wind up the paper that is moved through the receiver by the drive roller 206, which is operated by the paper-shifter motor 252, the winder motor 284, which is connected to the take-up reel 218, is normally connected in parallel with the paper-shifter motor 252, so that the winder motor operates each time the shifter motor is energized. The manually operable push-button switch 286 is provided by which the winder motor can be energized without energizing the operation of the paper-shifter motor 252, for example, to take-up slack in the paper strip 18 when the machine is being loaded or when the paper has been pulled back for reference.

The ink-pump solenoid 44 is connected in parallel with the paper-shifter solenoid 268 so that a fresh supply of ink is pumped from reservoir 28 to the tank 26 each time the paper-shifting circuits are energized.

The interlock circuits

If the local receiver is busy and the local transmitter were then energized, this would interfere with the reception of the partially completed message, and accordingly circuit means are provided which make it impossible to turn on the local transmitter when the local receiver is receiving an incoming message. Under these conditions, the transfer relay winding 358 will be energized and the switch TS–1 will be in the position shown in the drawing, and the signal relay winding 482 will not be energized. A circuit therefore is completed from ground through the left-lever turn-on switch LT–2, a fixed contact 544 and movable arm 546 of a signal relay switch SR–2, a movable armature 548, and a fixed contact 552 of master switch MS–4 (closed when the local transmitter is "off"), the energizing winding 554 of the interlock relay 478 and a current-limiting resistor 556 to the positive terminal 408 of the receiver power supply 382. The movable armature 476 of this interlock relay 478 is ganged mechanically to a locking mechanism (not shown) which prevents the unison ratchet switch 314 from being moved from the "off" to the "on" position. The voltage appearing across the interlock relay winding 478 and resistor 556 operates a neon lamp 558 which gives a visual indication that the receiver is busy. When the message from the other receiver is completed and no signal is being received by the local receiver, the left-lever turn-on switch LT–2 is opened, de-energizing the interlock winding 554. The interlock relay is not energized when the local transmitter is turned "on" because the switch MS-4 is then in open position.

*The platen light circuit*

Whenever the receiver is receiving a message, the paper-shifter relay winding 388 is energized and completes the platen-lighting circuit from A.-C. line 300 through the armature 506 and contact 508 of the paper-shifter relay switch PS-2, a half-wave rectifier 562, a filter resistor 564, and the parallel-connected platen-illuminating lamps 292 to the other A.-C. line 302. A high-capacity low-voltage filter condenser 566 is connected in parallel with the lamps 292.

From the foregoing, it will be observed that the telescriber embodying the invention is well adapted for the attainment of the ends and objects hereinbefore set forth and to be economically manufactured, the separate features being readily suited to common production methods. It is apparent that the various features may be modified in order to adapt the telescriber to particular use and that one or more of the features may be used without a corresponding use of other features, and the foregoing example is given for the purpose of illustrating a preferred embodiment of the invention and not for purposes of limitation except as set forth in the following claims or required by the prior art.

What is claimed is:

1. In a telescriber system for transmitting graphic characters from one location to another, receiving apparatus comprising signal transmission lines connected to carry telescribing signals, switch means connected to at least one of said lines and having first and second positions, respectively, connecting said receiver for first and second conditions of operation, switch control means responsive to the presence of writing signals on said lines and arranged to accuate said switch to said second position, and recording means responsive to writing signals on said lines when said receiver is in said second condition.

2. In a telescriber system for transmitting graphic characters from one location to another, receiving apparatus comprising signal transmission lines connected to receive writing and control signals, switch means connected to at least one of said lines and having first and second positions, respectively, connecting said receiver for signaling and for recording, signaling means under control of a signal circuit including at least one of said lines when said switch means is in said first position, recording means responsive to writing signals on said lines when said switch means is in said second position, and switch control means responsive to the presence of writing signals on said lines and arranged to actuate said switch from said first to said second position.

3. In a telescriber system for transmitting graphic characters from one location to another, receiving apparatus comprising signal transmission lines, a motor connected to at least one of said lines and responsive to the presence of writing signals thereon, switch means under the control of said motor and having first and second positions, respectively, connecting said receiver for first and second conditions of operation, said motor being arranged to actuate said switch from said first to said second position whenever writing signals are present on said lines, and recording means responsive to writing signals on said lines when said receiver is in said second condition of operation.

4. In a telescriber system for transmitting graphic characters from one location to another, receiving apparatus comprising signal transmission lines, a motor connected at at least one of said lines and responsive to writing signals thereon, recording means under the control of said motor for reproducing graphic characters, and switch means responsive to initial movement of said motor and having first and second positions arranged to connect said receiver for signaling and for recording, respectively, said switch means being biased to said first position in the absence of writing signals applied to said motor.

5. In a telescriber system for transmitting graphic characters from one location to another, receiving apparatus comprising signal transmission lines, a motor comprising a movably mounted coil connected to at least one of said lines and responsive to direct voltage writing signals thereon, a permanent magnet producing a direct magnetic field adjacent said coil, and spring means biasing said coil to a predetermined position in the absence of writing signals, and switch means responsive to initial movement of said coil from said predetermined position and having first and second positions arranged to connect said receiver for signaling and for recording, respectively, said switch means being biased to said first position when said coil is in said predetermined position.

6. In a telescriber system for transmitting graphic characters from one location to another, receiving apparatus comprising first and second signal transmission lines, first and second motors connected, respectively, to said first and second lines and responsive to writing signals thereon, recording means under the control of said motors for reproducing graphic characters, switch means under the control of said first motor and having first and second positions, and a control mechanism connected to said second line through said switch means when said switch means is in said first position and disconnected therefrom when said switch means is in said second position.

7. In a telescriber system for transmitting graphic characters from one location to another, receiving apparatus comprising first and second signal transmission lines, first and second motors, said first motor being connected to said first line and responsive to writing signals thereon, switch means under the control of said first motor and having first and second positions, and a control mechanism, circuit means connecting said control mechanism to said second line through said switch means only when said switch means is in said first position and connecting said second motor to said second line through said switch means only when said switch means is in said second position, and recording means under the control of said motors for reproducing graphic characters.

8. In a telescribing system wherein graphic characters traced by a stylus at a transmitter are reproduced simultaneously by a receiver, apparatus comprising a transmission channel for carrying writing signals from said transmitter to said receiver, a strip of paper, a recording pen positioned to write on said paper, a pen-driving motor responsive to said writing signals for directing the movement of said pen, switch means under the control of said pen-driving motor, a paper drive motor under the control of said switch means and a drive roller operated by said motor and arranged to move said paper through said receiver to expose successive portions of said paper for recording thereon by said pen.

9. Apparatus as in claim 8, wherein said pen is connected to said pen-driving motor by a drive-linkage, said linkage including a lost motion mechanism whereby linkage motion through a predetermined range of positions does not impart a corresponding motion to said pen, and wherein said switch means are operable when said linkage is driven into one of said predetermined positions.

10. In a telescribing system wherein graphic characters traced by a stylus at a transmitter are reproduced simultaneously by a receiver, apparatus comprising a transmission channel for carrying writing signals from said transmitter to said receiver, a strip of paper, a recording pen positioned to write on said paper, a pen-driving system responsive to said writing signals for directing the movement of said pen, a motor, a drive roller operated by said motor and arranged to move said paper through said receiver to expose successive portions of said paper for recording thereon by said pen, a cam driven by said roller and having a stop thereon, a pawl having a spring biasing it toward said cam, said pawl being arranged when in engagement with said cam to prevent movement of said cam beyond the position of said stop when it engages said pawl, a solenoid magnet connected to said pawl and arranged when energized to move said pawl away from said cam, a switch operated by said pawl, and circuit means for controlling the movement of said paper drive roller including means responsive to the interruption of writing signals on said channel for energizing said solenoid, a motor energizing circuit including said pawl-operated switch for energizing said motor, and separate synchronized means operated by said motor for de-energizing said solenoid and releasing said pawl whereby said pawl prevents movement of said drive roller when said cam stop engages said pawl.

11. In a telescriber system in which graphic characters traced by a stylus upon a writing surface at a transmitter are reproduced simultaneously at a receiver, the combination comprising a stylus-position sensing means arranged to continuously sense the location of said stylus and to generate first and second varying direct current writing signals representative of the position of said stylus on said surface and to generate an alternating current pen-lifter signal whenever said stylus is in contact with said surface, first and second transmission lines and a common circuit connected to said sensing means, said first writing signal being impressed between said first transmission line and the common circuit, said second writing signal being impressed between said second transmission line and the common circuit, said alternating current pen-lifter signal being impressed between said two lines, a receiver machine frame, a pen and a pen-linkage mechanism movably mounting said pen on said frame, a permanent magnet and field structure mounted upon said frame and having pole pieces defining first and second air gap portions, first and second electrical coils movably mounted in said first and second air gap portions and operatively connected to said pen-linkage mechanism, a first isolating inductor connected between said first coil and said first transmission line, a second isolating inductor connected between said second coil and said second transmission line, circuit means connecting each of said coils to said common circuit, a soure of pulsating "shake" current, a coupling circuit including at least one D.-C. blocking condenser coupling said "shake" current to each of said coils to cause said coils to tremble continuously, and a pen-lifter circuit for controlling said pen connected between said transmission lines, said first and second isolating inductors having a relatively low impedance to the D.-C. writing currents in said first and second transmission lines and a relatively high impedance to said "shake" current to confine it to said coils, and a correspondingly high impedance to the alternating current pen-lifter signal carried by said transmission lines to prevent said signal from entering said movable coils.

12. In a telescribing system whereby graphic characters traced at a transmitter are reproduced by a receiver, apparatus comprising a transmission channel for carrying graphic character signals from said transmitter to said receiver, a strip of paper, a stylus positioned to inscribe graphic characters on said paper, a stylus-driving mechanism responsive to said graphic character signals, paper drive control means under the control of said stylus-driving mechanism and operable when said mechanism has been caused to move into a predetermined position, a paper drive motor under the control of said paper drive control means, and a paper drive mechanism operated by said motor and arranged to move said paper through said receiver to expose successive portions of said paper for recording thereon by said stylus.

References Cited in the file of this patent

UNITED STATES PATENTS

| | | |
|---|---|---|
| 1,128,493 | O'Neill | Feb. 16, 1915 |
| 1,272,874 | Tiffany | July 16, 1918 |
| 2,008,970 | Spitzglass | July 23, 1935 |
| 2,216,248 | Moore | Oct. 1, 1940 |
| 2,308,710 | Nicholas | Jan. 10, 1943 |
| 2,355,087 | Lauder et al. | Aug. 8, 1944 |
| 2,455,617 | Sheppard | Dec. 7, 1948 |
| 2,565,612 | Levin | Aug. 28, 1951 |
| 2,557,329 | Wild | June 19, 1951 |
| 2,590,294 | Booth | Mar. 25, 1952 |
| 2,621,249 | Ress | Dec. 9, 1952 |